(12) United States Patent
Hachiro

(10) Patent No.: US 12,192,424 B2
(45) Date of Patent: Jan. 7, 2025

(54) PRINTING SYSTEM, METHOD FOR CONTROLLING PRINTING SYSTEM, AND STORAGE MEDIUM

(71) Applicant: CANON KABUSHIKI KAISHA, Tokyo (JP)

(72) Inventor: Shigeki Hachiro, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/363,425

(22) Filed: Aug. 1, 2023

(65) Prior Publication Data

US 2024/0056537 A1 Feb. 15, 2024

(30) Foreign Application Priority Data

Aug. 10, 2022 (JP) .................. 2022-127977

(51) Int. Cl.
*G06F 15/00* (2006.01)
*H04N 1/00* (2006.01)

(52) U.S. Cl.
CPC ..... *H04N 1/00779* (2013.01); *H04N 1/00344* (2013.01); *H04N 1/00424* (2013.01)

(58) Field of Classification Search
None
See application file for complete search history.

(56) References Cited

U.S. PATENT DOCUMENTS

| 5,594,529 A * | 1/1997 | Yamashita ......... G03G 15/5079 399/24 |
| 6,546,210 B1 * | 4/2003 | Nakamura ........... B41J 11/0055 271/145 |
| 2007/0263242 A1 * | 11/2007 | Takahashi .......... H04N 1/00413 358/1.14 |

FOREIGN PATENT DOCUMENTS

JP H02291335 A 12/1990

* cited by examiner

*Primary Examiner* — Mark R Milia
(74) *Attorney, Agent, or Firm* — Canon U.S.A., Inc. IP Division

(57) ABSTRACT

A printing system performs control to input sheet information regarding a single set of sheets consisting of a plurality of sheets including a sheet loaded in a sheet feeding unit of a printing apparatus. The printing system performs control to, based on the input sheet information, register the number of sheets corresponding to a single set in management information in which a stock of sheets is managed. The printing system also performs control to, based on consumption of a sheet by the printing apparatus, update information managed in the management information.

20 Claims, 18 Drawing Sheets

FIG.6A

| PRINTING APPARATUS SERIAL ID: 1221 ||||
|---|---|---|---|
| PRODUCT ID | INITIAL NUMBER OF SHEETS | ORDER THRESHOLD | NUMBER OF CONSUMED SHEETS |
|  |  |  |  |
|  |  |  |  |
|  |  |  |  |

FIG.6B

| PRINTING APPARATUS SERIAL ID: 1221 ||||
|---|---|---|---|
| PRODUCT ID | INITIAL NUMBER OF SHEETS | ORDER THRESHOLD | NUMBER OF CONSUMED SHEETS |
| 001002300123123123 | 300 | 240 | 0 |
|  |  |  |  |
|  |  |  |  |

FIG.8A

DID YOU REPLACE SHEETS?

| YES | NO |

FIG.8B

REGISTERED SHEETS?

| YES | NO |

FIG.12A

| SHEET ID | SHEET NAME |
|---|---|
| 001 | INEXPENSIVE PLAIN PAPER |
| 002 | HIGH-GRADE PLAIN PAPER |
| 003 | HIGH-GRADE PHOTOGRAPH GLOSSY PAPER |
| 004 | STANDARD PHOTOGRAPH GLOSSY PAPER |
| 005 | ART PAPER |

FIG.12B

| SIZE ID | SIZE |
|---|---|
| 001 | LETTER |
| 002 | A4 |
| 003 | B5 |
| 004 | 4 × 6 |
| 005 | L-SIZE |

FIG.14A

| PRINTING APPARATUS SERIAL ID: 1221 ||||
|---|---|---|---|
| PRODUCT ID | INITIAL NUMBER OF SHEETS | ORDER THRESHOLD | NUMBER OF CONSUMED SHEETS |
| 001002300123123123 | 300 | 240 | 1 |
| | | | |
| | | | |

FIG.14B

| PRINTING APPARATUS SERIAL ID: 1221 ||||
|---|---|---|---|
| PRODUCT ID | INITIAL NUMBER OF SHEETS | ORDER THRESHOLD | NUMBER OF CONSUMED SHEETS |
| 001002300123123123 | 300 | 240 | 240 |
| | | | |
| | | | |

FIG.15

| PRINTER SERIAL ID: 1221 | | | |
|---|---|---|---|
| PRODUCT ID | INITIAL NUMBER OF SHEETS | ORDER THRESHOLD | NUMBER OF CONSUMED SHEETS |
| 001002300123123123 | 300 | 240 | 100 |
| 002002050969329221 | 50 | 40 | 23 |
| 001002300321443098 | 300 | 240 | 0 |

PRINTING SYSTEM, METHOD FOR CONTROLLING PRINTING SYSTEM, AND STORAGE MEDIUM

BACKGROUND

Field of the Disclosure

The present disclosure relates to a printing system that manages the stock of print sheets used in a printing apparatus.

Description of the Related Art

In a printing apparatus that performs printing on a print sheet using ink or toner, the stock of print sheets is managed, and print sheets are replenished before the stock completely runs out, whereby it is possible to reduce downtime and increase productivity. Since print sheets come in a plurality of sizes and types, it is necessary to manage the stock of print sheets with respect to each size or each type.

Japanese Patent Application Laid-Open No. 2-291335 discusses a technique for counting the number of output sheets based on sheet information in print data, thereby estimating the period when printing can be performed with the number of stocked sheets. In this technique, the period where printing can be performed with the stock is estimated, whereby it is possible to purchase sheets before the stock runs out. Thus, the technique can contribute to a reduction in downtime.

In recent years, a service that automatically delivers a consumable product according to the stock status of the consumable product is implemented, and a technique for managing the stock of sheets as a consumable product is also required.

In some printing apparatus, the number of sheet feeding ports in which print sheets are loaded or the number of print sheets to be stacked is small in terms of space saving or low cost. For example, a household printing apparatus corresponds to such a printing apparatus. In such a printing apparatus, print sheets of a variety of types or sizes are used while being changed according to the use and loaded in a sheet feeding port. Thus, there can be a case where the setting of sheets made when printing is performed and sheets actually loaded in the sheet feeding port are different from each other. In such a case, in the technique discussed in Japanese Patent Application Laid-Open No. 2-291335, sheets may be counted based on erroneously set sheet information, and appropriate stock management may not be performed.

For example, in a space-saving or low-cost printing apparatus, such as a household printing apparatus described above, there may be a case where the number of sheets that can be loaded in a sheet feeding port is small. In such a printing apparatus, all sheets in a purchased single package (generally, a group of sheets consisting of a predetermined number of sheets is sold as a single package (a single volume)) cannot be loaded in the printing apparatus at a time. At the timing when the number of loaded sheets becomes small or at the timing when loaded sheets run out, the remaining sheets in the package are loaded. Thus, even if a sensor that measures the remaining number of sheets loaded in the sheet feeding port of the printing apparatus is used, it is not possible to manage the stock of sheets that are not yet loaded.

In contrast, in a case where a household printing apparatus is used in an environment with limited space, such as work from home, home study, or a satellite office, space for storing a large stock of print sheets is insufficient. Thus, a service that automatically delivers print sheets at an appropriate timing is required. Thus, a mechanism is required for appropriately managing the stock of print sheets and delivering sheets at an appropriate timing even in a case of household printing apparatus in which the number of sheet feeding ports is small and the number of sheets that can be stacked is also small.

SUMMARY

Aspects of the present disclosure provide a mechanism capable of appropriately managing the stock of sheets.

According to an aspect of the present disclosure, a printing system includes at least one memory and at least one processor and/or at least one circuit which function as an input unit configured to perform control to input sheet information regarding a single set of sheets consisting of a plurality of sheets including a sheet loaded in a sheet feeding unit of a printing apparatus, a registration unit configured to perform control to, based on the sheet information input by the input unit, register the number of sheets corresponding to a single set in management information in which a stock of sheets is managed, and an update unit configured to perform control to, based on consumption of a sheet by the printing apparatus, update information managed in the management information.

Further features of the present disclosure will become apparent from the following description of embodiments with reference to the attached drawings.

BRIEF DESCRIPTION OF THE DRAWINGS

FIGS. 6A and 6B are diagrams illustrating a stock management table stored in the server.

FIGS. 8A and 8B are diagrams illustrating messages displayed on a touch panel.

FIG. 12A is an example of a table for referencing a sheet name from an ID indicating a type of sheets in a product ID. FIG. 12B is an example of a table for referencing a sheet size from an ID indicating a sheet size in a product ID.

FIGS. 14A and 14B are diagrams illustrating other states of the stock management table stored in the server.

FIG. 15 is a diagram illustrating a stock management table in which a plurality of types of sheets is registered.

DESCRIPTION OF THE EMBODIMENTS

Exemplary embodiments of the present disclosure will now be described in detail with reference to the attached drawings. The following embodiments do not limit the present disclosure according to the appended claims, and not all the combinations of the features described in the present embodiments are essential for a method for solving the issues in the present disclosure.

A printing system according to a first embodiment is a system composed of a printing apparatus and a server. The printing system will be described below with reference to the attached drawings.

Figure 1:
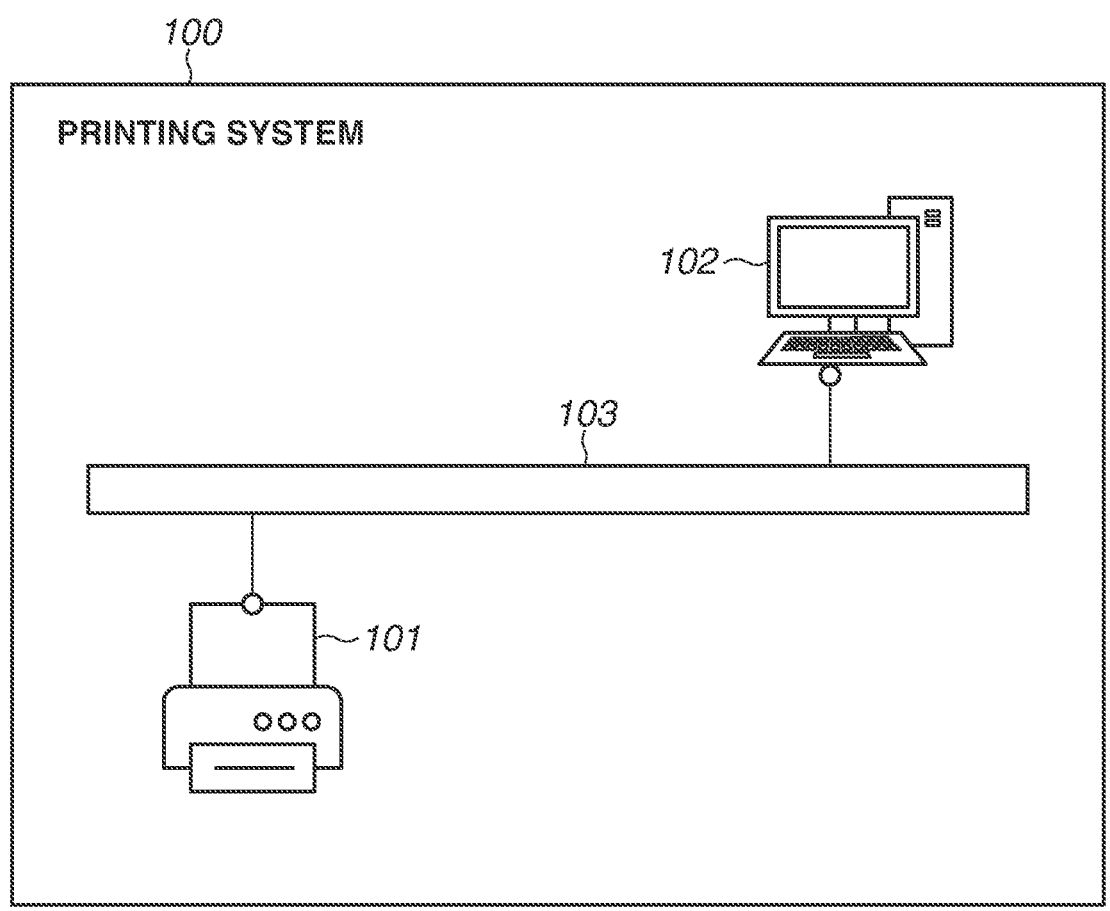
FIG. 1 is a diagram illustrating a configuration of an entirety of a printing system according to the present embodiment.

FIG. 1 is a diagram illustrating an example of the configuration of the entirety of the printing system according to the present embodiment.

A print product provision system according to the present embodiment has a configuration in which a printing apparatus 101 and a server 102 can communicate with each other via a network 103. Alternatively, a plurality of printing apparatuses 101 can also be connected to the network 103. The printing apparatus 101 can be configured to be connected to the network 103 in a wired manner, or can be configured to be connected to the network 103 in a wireless manner.

Although a network including the Internet is assumed as the network 103, the present disclosure is not limited to this. Alternatively, the network 103 can include a wired network and a wireless network.

Although the present embodiment is described using an inkjet printing apparatus as an example of the printing apparatus 101, an electrophotographic printing apparatus or a printing apparatus using another printing method can also be employed.

The server 102 can be achieved by a single computer, or can be achieved by a plurality of computers. For example, the server 102 can be a cloud service server achieved using a cloud computing technique, or can be an on-premises server.

<Printing Apparatus>

Figure 2:
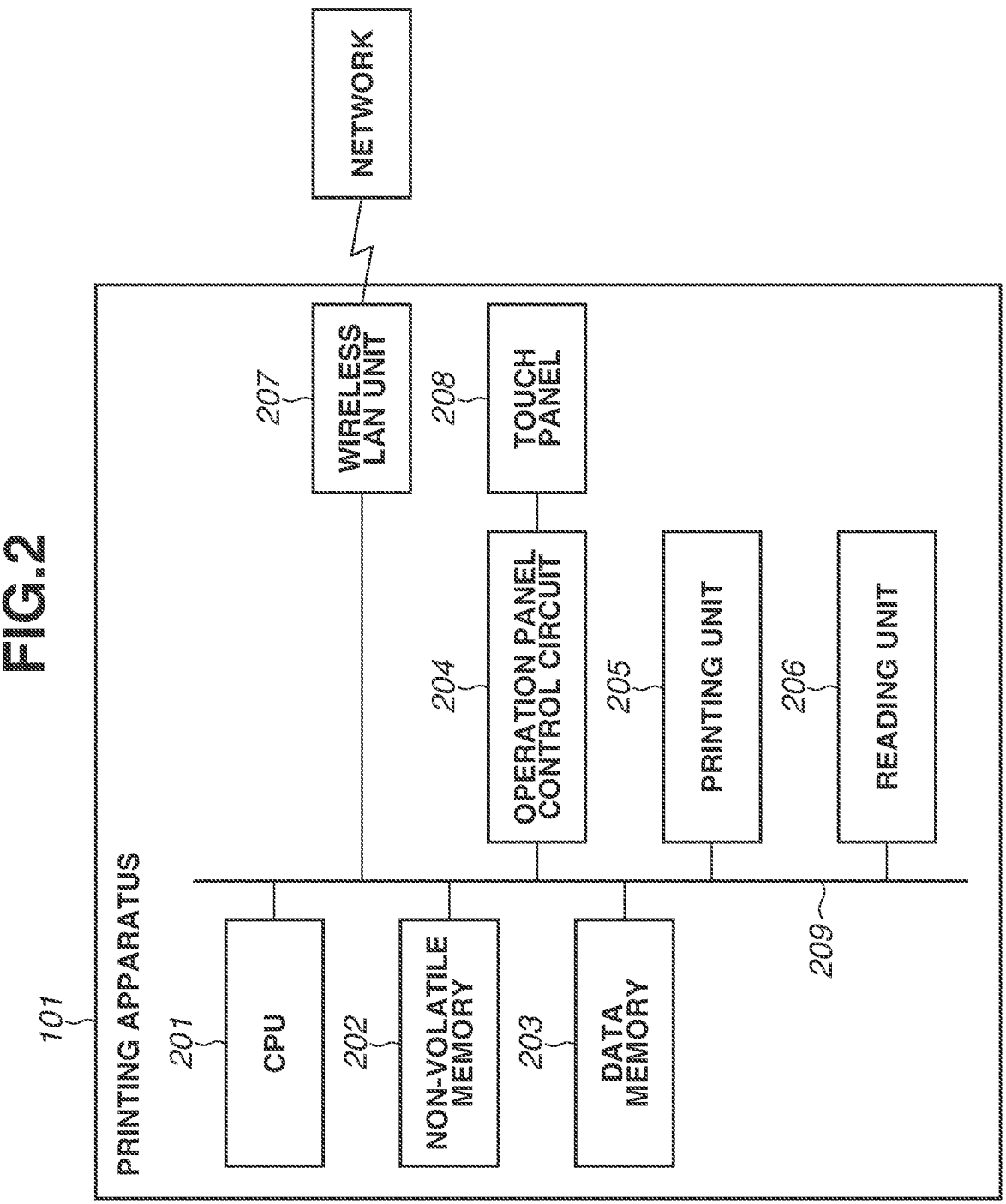
FIG. 2 is a block diagram illustrating a configuration of a printing apparatus according to the present embodiment.

FIG. 2 is a block diagram illustrating an example of the configuration of the printing apparatus 101.

The printing apparatus 101 includes an internal bus 209. The internal bus 209 is connected with a central processing unit (CPU) 201, a non-volatile memory 202, a data memory 203, an operation panel control circuit 204, a printing unit 205, a reading unit 206, and a wireless local area network (LAN) unit 207. The operation panel control circuit 204 is connected with an operation panel (an operation unit), such as a touch panel 208.

In the non-volatile memory 202, printing apparatus control software is stored. The printing apparatus 101 is controlled by the CPU 201 reading and executing the printing apparatus control software. The data memory 203 is a volatile memory used as a work area for the CPU 201 or used to temporarily store data to be transmitted via the wireless LAN unit 207 and data received via the wireless LAN unit 207.

The operation panel control circuit 204 controls the touch panel 208 connected to the operation panel control circuit 204. The touch panel 208 displays information to a user and receives an instruction given by the user performing a touch operation on the touch panel 208.

The printing unit 205 is a printer unit that controls a motor and a sensor of the printing apparatus 101 to print an image stored in the data memory 203 on paper. The reading unit 206 is a scanner unit that controls a motor and a sensor to read an image using an optical sensor and stores the read image in the data memory 203.

The printing apparatus 101 can transmit and receive data to and from an external terminal on a network via the wireless LAN unit 207. In the present embodiment, the wireless LAN unit 207 is connected to the network 103 (FIG. 1).

Figure 3:
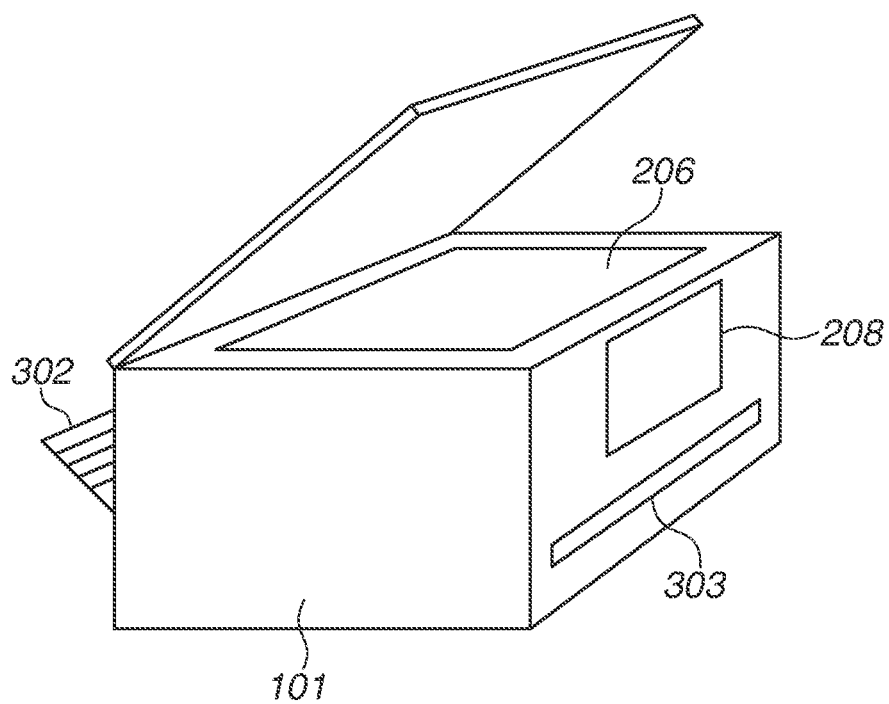
FIG. 3 is a perspective view illustrating a configuration of the printing apparatus according to the present embodiment.

FIG. 3 is a perspective view simply illustrating the printing apparatus 101.

As illustrated in FIG. 3, it is possible to confirm the reading unit 206, the touch panel 208, and a sheet feeding port 302 and a sheet discharge port 303 of the printing unit 205 from outside the printing apparatus 101. The printing unit 205 pulls in a sheet loaded in the sheet feeding port 302, performs printing on the sheet, and discharges the sheet from the sheet discharge port 303. In the sheet feeding port 302, a sheet stacking sensor (not illustrated) is provided. By referencing the sheet stacking sensor, the CPU 201 can know whether sheets are currently stacked. If the sheet stacking sensor detects a change from a state where sheets are not stacked to a state where sheets are stacked, the sheet stacking sensor considers that sheets are loaded (stacked, set, or placed), and sends a signal to the CPU 201. Alternatively, the sheet feeding port 302 as a sheet feeding unit can be configured to load (hold or store) sheets using a sheet feeding cassette. In such a case, the sheet stacking sensor can be provided in the sheet feeding cassette. Yet alternatively, a configuration can be provided in which a sensor that detects the opening and closing of the sheet feeding cassette is provided, and the sensor considers that sheets are loaded if the sensor detects the opening and closing of the sheet feeding cassette, and sends a signal to the CPU 201.

<Server>

The server 102 has the function of communicating with a plurality of printing apparatuses 101, managing the stock of print sheets to be used in each printing apparatus 101, and notifying the printing apparatus 101 of the start of the delivery of sheets to the printing apparatus 101. The details are described below.

Figure 4:
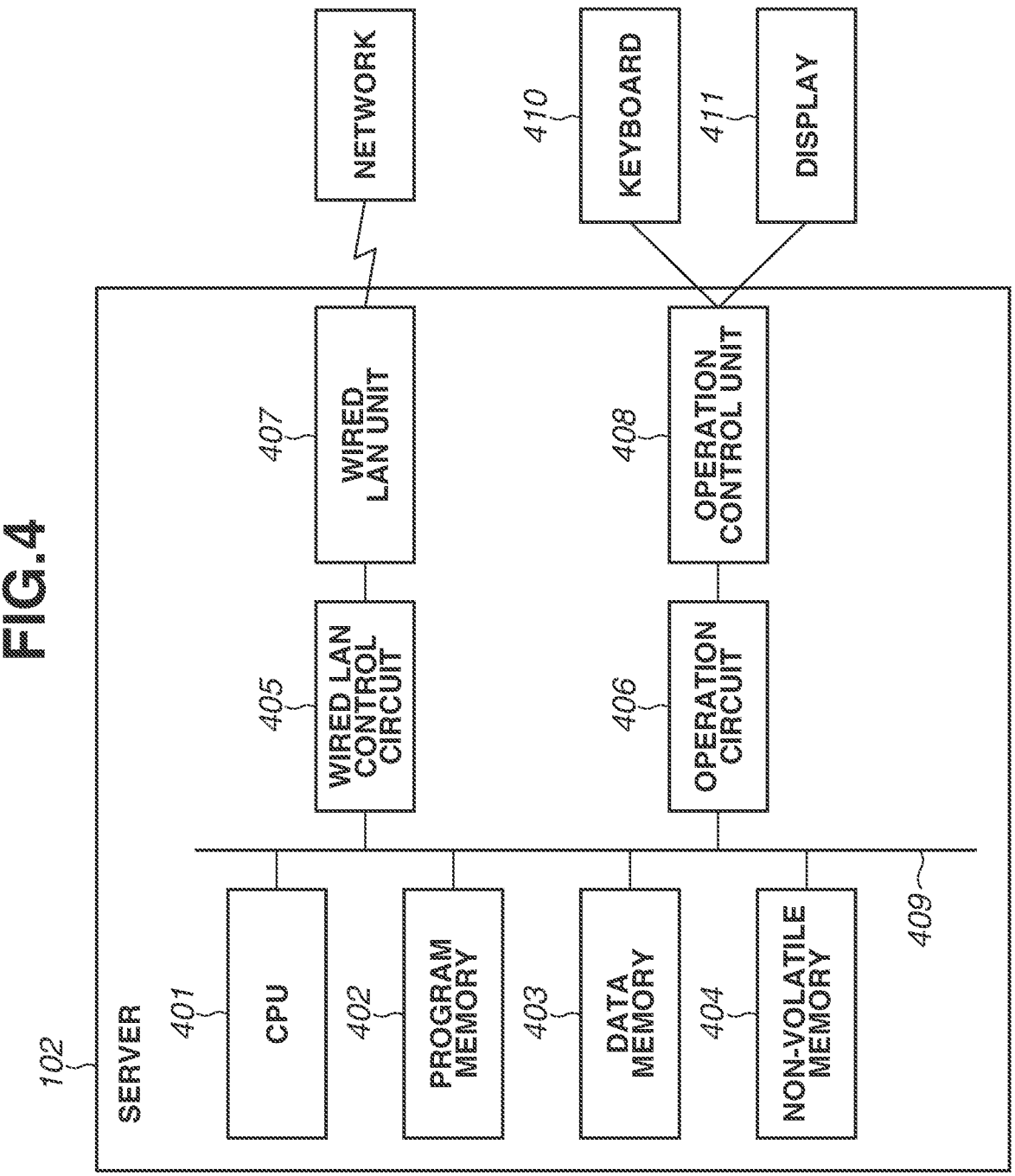
FIG. 4 is a block diagram illustrating a configuration of a server according to the present embodiment.

FIG. 4 is a block diagram illustrating an example of the configuration of the server 102.

The server 102 includes an internal bus 409. To the internal bus 409, a CPU 401, a program memory 402, a data memory 403, a non-volatile memory 404, a wired LAN control circuit 405, and an operation circuit 406 are connected.

A wired LAN unit 407 is connected to the wired LAN control circuit 405.

Further, a keyboard 410 and a display 411 are connected to the operation circuit 406 via an operation control unit 408.

The CPU 401 performs various types of control by reading and executing various pieces of software (programs) stored in the program memory 402 or the non-volatile memory 404. The data memory 403 is a volatile memory used as a work area for the CPU 401 or used to temporarily store data to be transmitted via the wired LAN unit 407 and data received via the wired LAN unit 407.

<Sequence of Printing System>

In the present embodiment, a printing system 100 performs a printing apparatus registration sequence, a print sheet registration sequence, and a print sheet stock management sequence, thereby managing the stock of print sheets and starting the delivery of print sheets.

The printing apparatus registration sequence is a sequence for registering the printing apparatus 101 in the server 102 when the user installs the printing apparatus 101. The printing apparatus registration sequence will now described with reference to FIG. 5.

Figure 5:
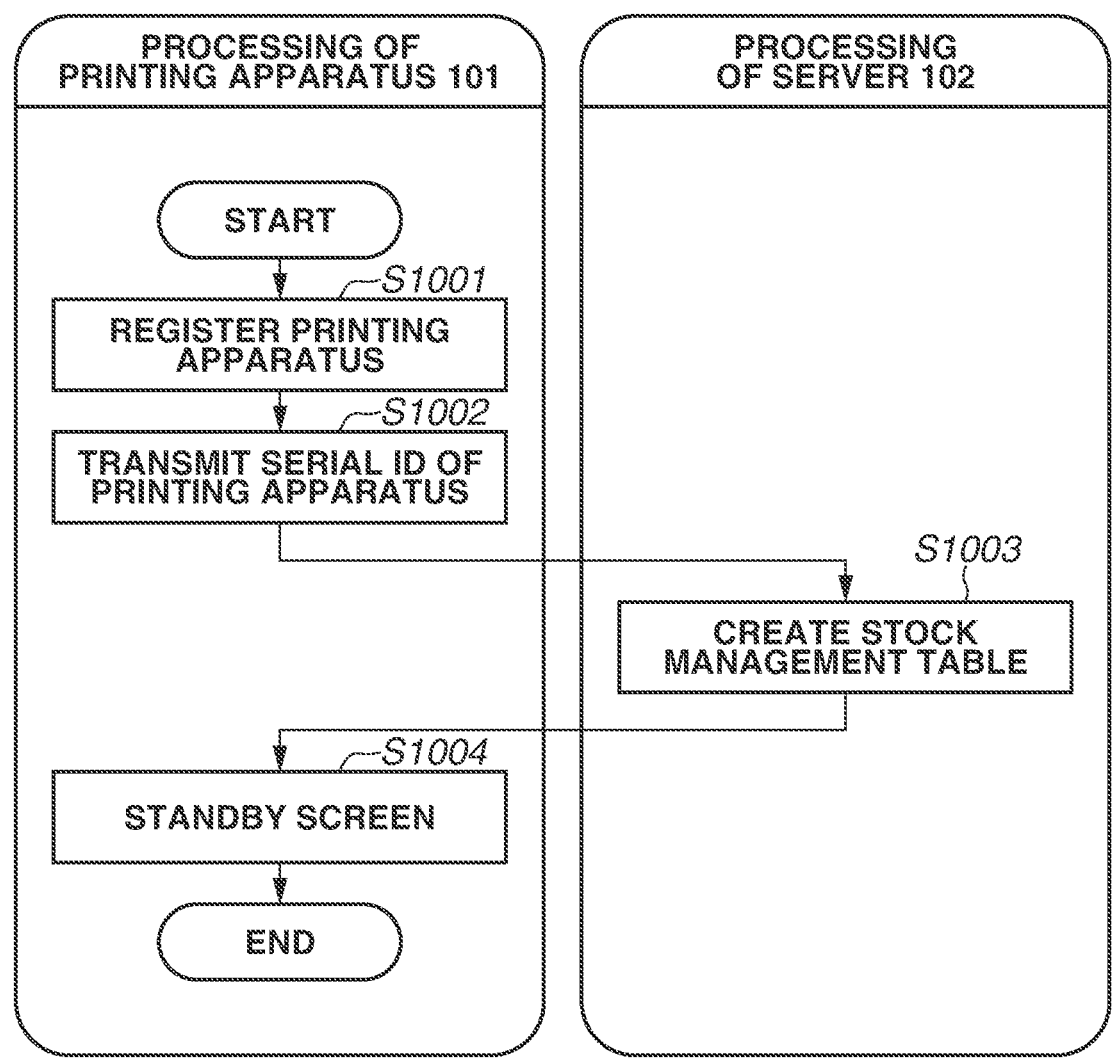
FIG. 5 is a sequence diagram illustrating a printing apparatus registration sequence according to a first embodiment.

FIG. 5 is a sequence diagram illustrating an example of the printing apparatus registration sequence according to the first embodiment. In the sequence diagram illustrated in FIG. 5 and sequence diagrams illustrated in FIGS. 7 and 13 described below, the processing of the printing apparatus 101 is achieved by the CPU 201 reading and executing a program stored in the non-volatile memory 202. Similarly, the processing of the server 102 is achieved by the CPU 401 reading and executing a program stored in the program memory 402 or the non-volatile memory 404.

In step S1001, the printing apparatus 101 displays on the touch panel 208 a message indicating that the registration of the printing apparatus 101 is started. The processing then proceeds to step S1002. For example, the process of step S1001 can be configured to be executed by the user performing a predetermined operation through the touch panel 208, or can be configured to be executed when the printing apparatus 101 that is not yet registered is powered on, or can be executed with another configuration.

In step S1002, the printing apparatus 101 transmits to the server 102 identification information (a serial identifier (ID) is used in the present embodiment) uniquely determined with respect to each individual printing apparatus 101. In the present embodiment, the serial ID determined with respect to each individual printing apparatus 101 is stored in the non-volatile memory 202 before the printing apparatus 101 is shipped from the factory. In step S1002, the printing apparatus 101 thus reads the serial ID from the non-volatile memory 202 and transmits the serial ID to the server 102. The identification information regarding the printing apparatus 101 is not limited to the serial ID, and can be other information, such as a media access control (MAC) address, so long as the identification information can identify each individual printing apparatus 101.

If the server 102 receives the serial ID transmitted from the printing apparatus 101, the server 102 executes the process of step S1003. In step S1003, the server 102 creates a stock management table corresponding to the serial ID received from the printing apparatus 101 and saves the stock management table in the non-volatile memory 404. The stock management table will now be described with reference to FIGS. 6A and 6B.

FIGS. 6A and 6B are diagrams illustrating examples of the stock management table stored in the server 102.

In the stock management table, it is possible to register a product ID of sheets, the initial number of sheets of the sheets corresponding to the product ID, an order threshold for determining the timing when the sheets are ordered, and the number of consumed sheets of the sheets, with respect to each piece of identification information (each serial ID) regarding the printing apparatus 101. If the serial ID of the printing apparatus 101 is "1221", then in step S1003 in FIG. 5, a stock management table in which the serial ID is registered as illustrated in FIG. 6A is created and stored in the non-volatile memory 404. Since the stock management table saved in step S1003 is in the initial state where the stock management table is created, the table is saved in the state where items other than the serial ID are empty as illustrated in FIG. 6A. If the creation of the stock management table is completed, the server 102 returns a response to the printing apparatus 101.

If the printing apparatus 101 receives the response from the server 102, the printing apparatus 101 executes the process of step S1004. In step S1004, the printing apparatus 101 causes the display of the touch panel 208 to transition to a screen (e.g., a home screen) before the loading of sheets is detected in step S2001 in FIG. 7 described below.

By the above sequence, the printing apparatus 101 can be registered in the server 102.

In the printing system 100, a plurality of printing apparatuses 101 can be connected to the network 103, and a plurality of printing apparatuses 101 can be registered in the server 102. Since different serial IDs are given to the respective printing apparatuses 101, the server 102 assigns each serial ID to a stock management table and thereby can save and manage a stock management table for each of the plurality of printing apparatuses 101. By the above sequence, the server 102 saves the stock management table to which the serial ID is assigned, whereby the registration of the printing apparatus 101 is completed.

The printing apparatus 101 can be registered through an apparatus other than the printing apparatus 101, e.g., an external terminal, such as a smartphone, a tablet terminal, or a personal computer (PC). In this case, the user inputs the serial ID of the printing apparatus 101 (e.g., added to the housing of the printing apparatus 101) through the external terminal. Alternatively, a code including the Uniform Resource Locator (URL) of the server 102 for registering the printing apparatus 101 and the identification information regarding the printing apparatus 101 can be added to the housing of the printing apparatus 101. Examples of the code include a two-dimensional code, such as a Quick Response (QR) Code®, that is a one-dimensional code similar to a barcode. The external apparatus can access the server 102 by reading the code using a camera of the external apparatus and register the printing apparatus 101. Yet alternatively, another method can be used.

Figure 7:
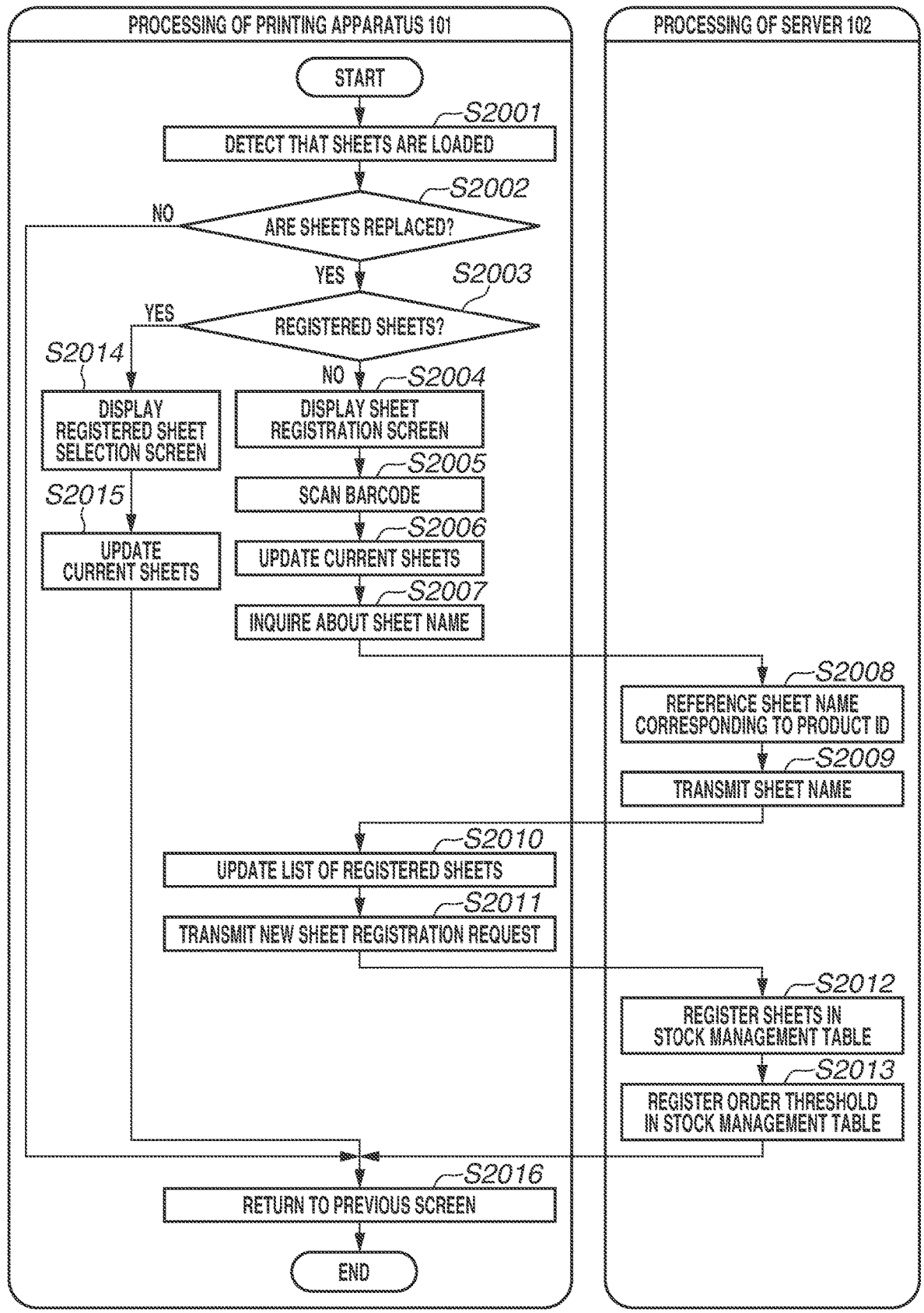
FIG. 7 is a sequence diagram illustrating a print sheet registration sequence according to the first embodiment.

FIG. 7 is a sequence diagram illustrating an example of the print sheet registration sequence according to the first embodiment.

If the user loads sheets in the sheet feeding port 302, the sheet stacking sensor detects the sheets. Thus, in step S2001, the printing apparatus 101 detects that sheets are loaded. In a case where the sheet feeding cassette is included instead of or in combination with the sheet feeding port 302, the printing apparatus 101 can determine that sheets are loaded according to the holding of sheets in the sheet feeding cassette by the user. Alternatively, the printing apparatus 101 can determine that sheets are loaded according to the opening and closing of the sheet feeding cassette. This step is performed not only in a case where the loading of sheets is detected, but also by any method so long as the use of new sheets is started. For example, the processing can proceed from step S2001 by the user operating the operation unit of the printing apparatus 101 or by a user operation through an external PC that manages the printing apparatus 101.

In step S2002, the printing apparatus 101 displays on the touch panel 208 a screen for inquiring of the user about whether the sheets currently loaded in the sheet feeding port 302 and registered sheets are the same as each other. Then, the printing apparatus 101 determines whether sheets are replaced according to a user operation. FIG. 8A illustrates an example of this screen.

FIGS. 8A and 8B are diagrams illustrating examples of messages displayed on the touch panel 208.

In step S2002 in FIG. 7, a screen as illustrated in FIG. 8A is displayed on the touch panel 208. The user then taps "Yes" or "No" in response to a message "Did you replace sheets?" If the user taps "No", the printing apparatus 101 determines that it is not necessary to newly register print sheets (NO in step S2002) because the currently loaded sheets are the same sheets as the currently registered sheets (i.e., sheets are not replaced). The processing then proceeds to step S2016. In this case, in step S2016, the printing apparatus 101 returns the screen of the touch panel 208 to the screen before the loading of sheets is detected in step S2001. The print sheet registration sequence then ends.

If, in contrast, the user taps "Yes" on the screen in FIG. 8A, the printing apparatus 101 determines that sheets different from the currently registered sheets are loaded (sheets are replaced) and that it is therefore necessary to newly register print sheets (YES in step S2002). The processing then proceeds to step S2003.

In a case where sheets registered in the past are not present at all, such as a case where sheets are loaded in the printing apparatus 101 for the first time, the currently loaded sheets are not registered, and therefore the printing apparatus 101 skips the process of step S2002 to cause the processing to proceed to step S2003. The printing apparatus 101 saves a list of sheets registered in the past as a table in the non-volatile memory 202.

In step S2003, the printing apparatus 101 displays on the touch panel 208 a message inquiring of the user about whether the replaced and loaded sheets are sheets registered in the past. The printing apparatus 101 then determines whether the loaded sheets are registered sheets according to a user operation. FIG. 8B illustrates an example of this screen. In step S2003, a screen as illustrated in FIG. 8B is displayed on the touch panel 208. If the user taps "No" in response to a message "Registered sheets?", the printing apparatus 101 determines that the currently loaded sheets are new sheets (yet unregistered sheets) (NO in step S2003). The processing then proceeds to step S2004.

Figure 9A:
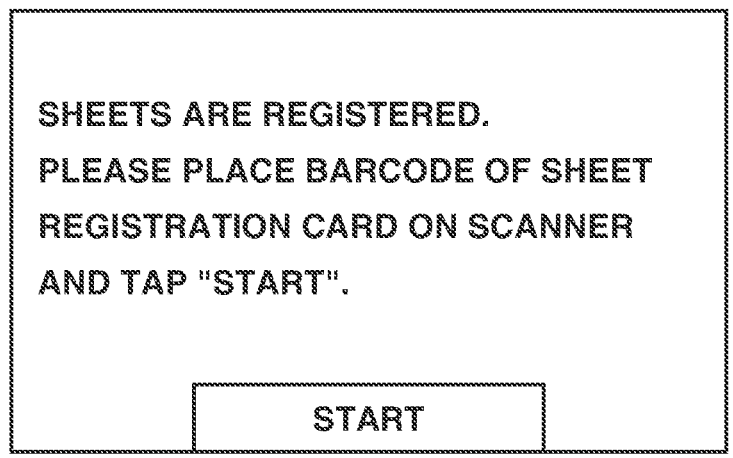
FIGS. 9A and 9B are diagrams illustrating messages displayed on the touch panel.

In step S2004, the printing apparatus 101 displays a screen for urging the user to prepare to register the sheets. FIG. 9A illustrates an example of this screen. In the present embodiment, a single group of sheets consisting of a predetermined number of sheets is sold and delivered as a single package (a single volume). For example, a sheet registration card 1000 as illustrated in FIG. 10 described below is included in each package of above-described sheets delivered to the user.

Figure 9B:
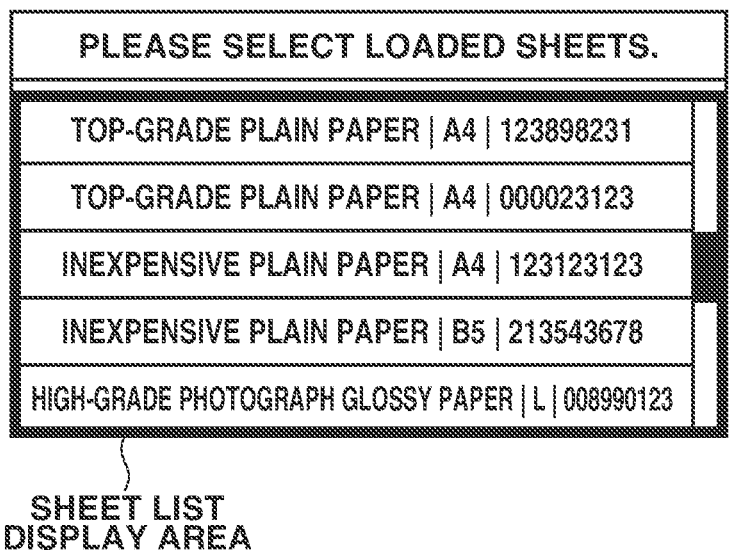

FIGS. 9A and 9B are diagrams illustrating examples of messages displayed on the touch panel 208.

In the present embodiment, in step S2004 in FIG. 7, the printing apparatus 101 displays a message urging the user to place the sheet registration card 1000 packed together with the print sheets owned by the user on the scanner and tap "start", as illustrated in FIG. 9A.

Figure 10:
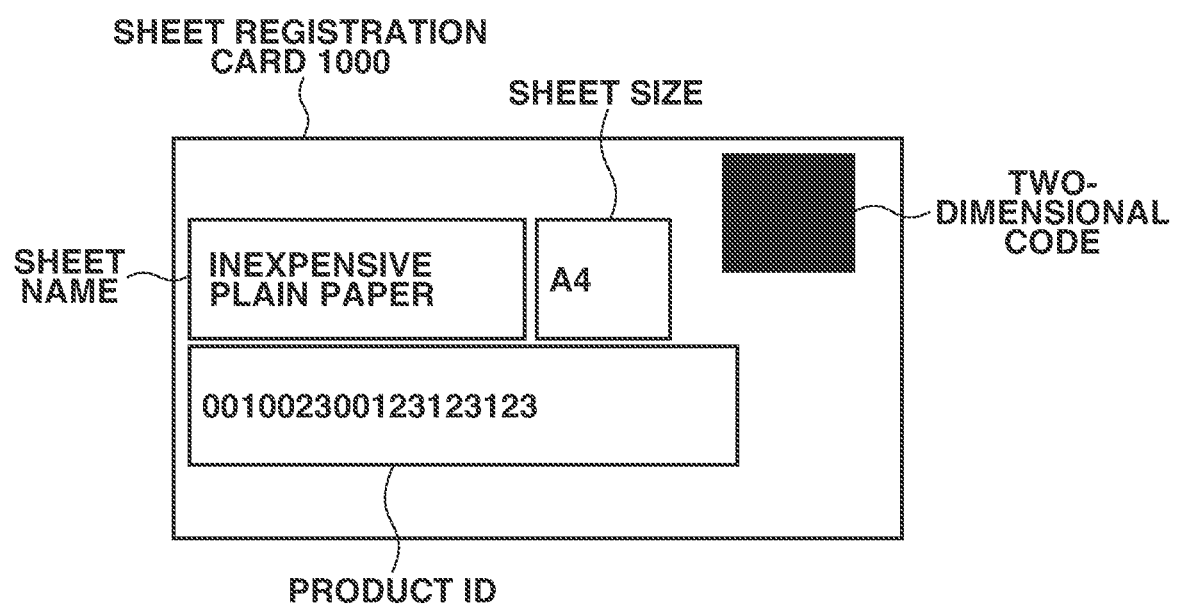
FIG. 10 is a diagram illustrating a sheet registration card.

FIG. 10 is a diagram illustrating an example of the sheet registration card 1000 included in the package of the sheets delivered to the user.

On the sheet registration card 1000, a sheet name, a sheet size, a product ID (using any of or at least any of a numerical value, a character, and a sign), and a two-dimensional code (code image) of the product ID are printed. The two-dimensional code of the product ID is a two-dimensional image pattern that is generated from the product ID and can be restored to the product ID by the printing apparatus 101. The two-dimensional code is a QR Code®, for example. The code of the product ID written on the sheet registration card 1000 is not limited to a two-dimensional code, and can be written in a code in another format, such as a one-dimensional code (a so-called barcode).

Figure 11:
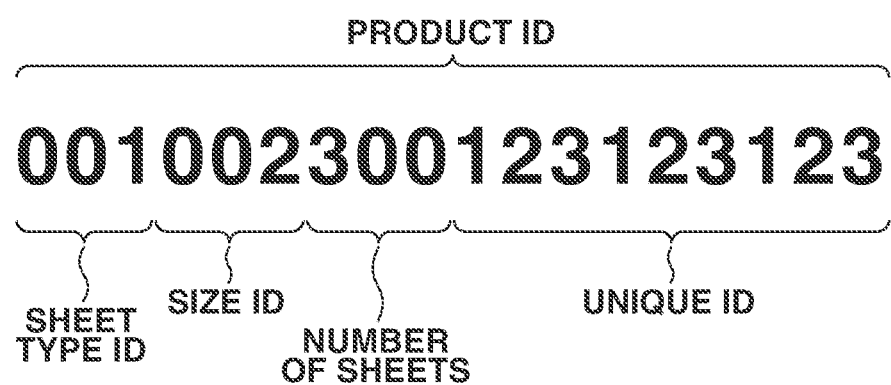
FIG. 11 is a diagram illustrating information indicated by digits of a product identifier (ID).

FIG. 11 is a diagram illustrating information indicated by the digits of the product ID.

For example, the product ID is an 18-digit numerical value determined with respect to each package of sheets to be delivered.

In the present embodiment, as illustrated in FIG. 11, the three digits from the left are an ID indicating the type of the sheets, and the next three digits are an ID indicating the size of the sheets. The subsequent three digits indicate the number of the sheets included in the package. The remaining nine digits are a unique ID determined with respect to each package of sheets so that the product ID does not overlap. That is, it is possible to identify the type, the size, and the number of the sheets included in the package of the sheets, based on the product ID.

If the user places the sheet registration card 1000 on the scanner of the reading unit 206 and taps "start" according to the display in step S2004 in FIG. 7, the processing proceeds to step S2005.

In step S2005, the printing apparatus 101 reads the sheet registration card 1000 using the scanner of the reading unit 206 and stores an image of the sheet registration card 1000 in the data memory 403. The printing apparatus 101 also detects the position of the two-dimensional code of the product ID from the image stored in the data memory 403 and restores the product ID represented by the numerical value by decoding the two-dimensional code.

In step S2006, the printing apparatus 101 stores the product ID restored in step S2005 as information regarding the sheets currently loaded in the sheet feeding port 302 in the non-volatile memory 202. The product ID is registered using the two-dimensional code in the present embodiment. However, a configuration can be employed in which the user registers the product ID by inputting the numerical value of the product ID through the touch panel 208. Alternatively, the product ID of the sheets can be input through an external terminal, such as a smartphone, a tablet terminal, and a PC (or can be read using a camera) and transmitted to the printing apparatus 101. Further, a configuration can be employed in which not the product ID but sheet information, such as the sheet name, the size, and the number of the sheets, is directly input through the touch panel 208 or the external terminal.

In step S2007, the printing apparatus 101 issues a command for inquiring of the server 102 about the name and the size of the sheets with the numerical value of the product ID decoded in step S2005 as parameters. If the server 102 receives the command, the processing proceeds to step S2008. In step S2008, the server 102 references the product ID included in the parameters of the received command for inquiring of the server 102 about the name and the size of the sheets and searches for the name and the size of the corresponding sheets. In the non-volatile memory 404 of the server 102, reference tables for referencing the name and the size of sheets from a product ID are saved.

FIGS. 12A and 12B are diagrams illustrating examples of the reference tables for referencing the name and the size of sheets from a product ID.

FIG. 12A is an example of a table for referencing the sheet name from an ID indicating the type of sheets in a product ID. FIG. 12B is an example of a table for referencing the sheet size from an ID indicating the sheet size in a product ID.

In step S2008, if the received product ID is "001002300123123123" as illustrated in FIG. 11, the first three digits are "001", and thus the server 102 references the table illustrated in FIG. 12A and identifies the sheet name as "inexpensive plain paper". Similarly, the ID indicating the size is "002", and thus the server 102 references the table illustrated in FIG. 12B and identifies the sheet size as "A4".

In step S2009, the server 102 sends a response to the command for inquiring of the server 102 about the name and the size of the sheets to the printing apparatus 101. At this time, the server 102 sends the response with character information regarding the name and the size of the sheets identified in step S2008 as parameters.

If the printing apparatus 101 receives the response from the server 102, the processing proceeds to step S2010. The printing apparatus 101 saves a list of pieces of sheet information (e.g., pieces of information including the sheet name, the sheet size, and the product ID as a set) regarding sheets registered in the server 102 in the past as a table in the non-volatile memory 202. In step S2010, the printing apparatus 101 registers the character strings indicating the type and the size of the sheets returned from the server 102 in the list of sheets registered in the server 102 in the past.

In step S2011, the printing apparatus 101 transmits a new sheet registration request command to the server 102. The serial ID of the printing apparatus 101 and the product ID of the sheets currently loaded in the sheet feeding port 302 that is saved in step S2006 are added to the new sheet registration request command as parameters.

If the server 102 receives the new sheet registration request command, the processing proceeds to step S2012. In step S2012, the server 102 references the serial ID among the parameters in the received new sheet registration request command to identify a stock management table corresponding to the serial ID. The server 102 further registers the product ID among the parameters in the new sheet registration request command, in the identified stock management table. The server 102 also reads the initial number of sheets of the sheets from the product ID, and registers the initial number of sheets in the identified stock management table.

In step S2013, the server 102 registers the threshold for determining the timing when sheets are ordered (the order threshold) in the identified stock management table, and transmits a response to the new sheet registration request command to the printing apparatus 101. In the present embodiment, the order threshold is set to 80 percent of the initial number of sheets of the sheets. The present disclosure, however, is not limited to this. For example, a criterion for the user to obtain the order threshold can be set with respect to each user, each printing apparatus, or each sheet type. For example, the order threshold can be set to 70 percent of the initial number of sheets for a user who quickly consumes sheets. The order threshold can be set to 90 percent of the initial number of sheets for a user who slowly consumes sheets. The order threshold can also be set to 70 percent of the initial number of sheets for A4-size inexpensive plain paper, which is quickly consumed. The order threshold can be set to 90 percent of the initial number of sheets for A4-size top-grade plain paper, which is slowly consumed.

FIG. 6B illustrates the state where in the stock management table corresponding to the printing apparatus 101 of which the serial ID is "1221" among stock management tables, the sheets of which the product ID is "001002300123123123" are registered in steps S2012 and S2013 in FIG. 7.

In step S2012, the product ID and 300 sheets as the initial number of sheets of the sheets identified based on the product ID are registered as illustrated in FIG. 6B. In step S2013, 240 sheets, which is 80 percent of 300 sheets, is registered as the order threshold. Since the printing apparatus 101 has not yet consumed any of the sheets, the number of consumed sheets is 0, which is the initial value.

If the printing apparatus 101 receives the response to the new sheet registration request command transmitted from the server 102, the processing proceeds to step S2016. In step S2016, the printing apparatus 101 returns the screen of the touch panel 208 to the screen before the loading of sheets is detected in step S2001.

By the above sequence, the sheets are registered in the stock management table, whereby the sheet registration sequence is completed.

A case is also possible where the user loads sheets registered in the past again.

In this case, in step S2003 in FIG. 7, the user taps "Yes" in response to the message "Registered sheets?" According to this operation, the printing apparatus 101 determines that the currently loaded sheets are the same sheets as sheets registered in the past (registered sheets) (YES in step S2003), and the processing proceeds to step S2014.

In step S2014, the printing apparatus 101 displays a message "Please select loaded sheets" and the list of registered sheets stored in step S2010 in the past on the screen of the touch panel 208.

FIG. 9B is an example of a screen displayed on the touch panel 208 in step S2014 in FIG. 7.

As illustrated in FIG. 9B, the names, the sizes, and the unique IDs in the product IDs of sheets registered in the past are displayed as a list. If the user taps any item in the list of registered sheets in the state of step S2014 in FIG. 7, the processing proceeds to step S2015. In the list of sheets registered in the past that is displayed on the screen in FIG. 9B, information regarding unnecessary sheets can be manually deleted through the touch panel 208 or the external terminal by the user. Alternatively, a configuration can be employed in which in the list of sheets registered in the past, information regarding sheets that are not loaded for a predetermined period is automatically deleted. Although described below, a configuration can be employed in which, if all the sheets in the package are consumed, the registration corresponding to the product ID of the package is automatically deleted from the list of sheets.

In step S2015, the printing apparatus 101 changes the sheets currently loaded in the sheet feeding port 302 to the sheets selected by the user in step S2014 and stores the sheet information of the selected sheets in the non-volatile memory 202, and causes the processing to proceed to step S2016. Stock management with respect to each serial ID of the printing apparatus 101 in the present embodiment is performed with respect to each product ID of sheets as illustrated in FIG. 6B. Thus, it is necessary to separately manage the remaining numbers of the sheets even if sheets have the same name and the same size. If the user registers sheets of which the product ID is "002002300123898231" after the user registers sheets of which the product ID is "002002300000023123", the stocks of the sheets are separately managed although both types of the sheets are "top-grade plain paper" and "A4". Thus, a configuration is employed in which, when a list of registered sheets is displayed, the unique IDs in the product IDs are also displayed on the screen that displays the list of sheets as illustrated in FIG. 9B, so that the user can distinguish the sheets even if sheets have the same sheet name and the same size.

A description will now be given of the behaviors of the printing apparatus 101 and the server 102 when a sheet is consumed using the printing apparatus 101. The print sheet stock management sequence is a sequence for managing the stock of sheets when a sheet is consumed by the printing apparatus 101 performing printing. The print sheet stock management sequence will now be described with reference to FIG. 13.

Figure 13:
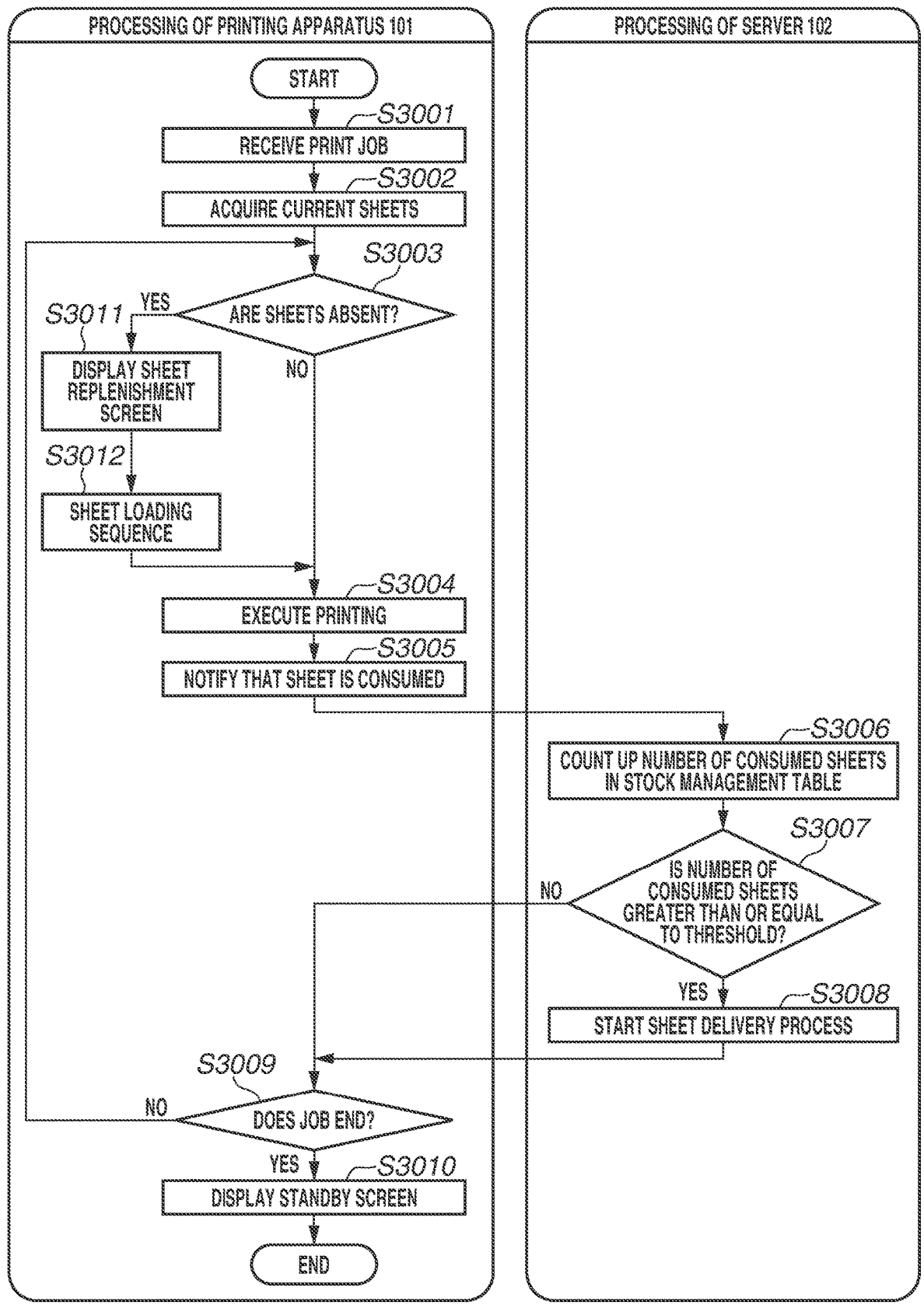
FIG. 13 is a sequence diagram illustrating a print sheet stock management sequence according to the first embodiment.

FIG. 13 is a sequence diagram illustrating an example of the print sheet stock management sequence according to the first embodiment.

In step S3001, for example, the user gives an instruction to execute a copy function by operating a menu on the touch panel 208, whereby the printing apparatus 101 receives a print job. At this time, the user can specify the type and the size of print sheets in the menu on the touch panel 208. Alternatively, a general-purpose terminal, such as a PC, can be connected to the network 103, and a print job can be issued through the general-purpose terminal. In this case, in step S3001, the printing apparatus 101 receives a print job to which print data transmitted from the terminal is added and in which the type and the size of sheets are specified.

In step S3002, the printing apparatus 101 reads the information regarding the sheets currently loaded in the sheet feeding port 302 that is saved in step S2006 in FIG. 7 from the non-volatile memory 202.

In step S3003, the printing apparatus 101 compares the type and the size of the print sheets specified in the print job received in step S3001 and those of the sheets currently loaded in the sheet feeding port 302 that are read in step S3002 to confirm whether the type and the size of the print sheets specified in the print job match those of the sheets currently loaded in the sheet feeding port 302. Further, the printing apparatus 101 references the sheet stacking sensor of the sheet feeding port 302 and confirms whether sheets are loaded.

If the type and the size of the print sheets specified in the print job are different from those of the sheets currently loaded in the sheet feeding port 302, or if sheets are not loaded in the sheet feeding port 302, the printing apparatus 101 determines that "sheets are absent" (YES in step S3003), and the processing proceeds to step S3011.

In step S3011, the printing apparatus 101 displays a message "Please load sheets" and the type and the name of the sheets specified in the print job on the touch panel 208.

In step S3012, the printing apparatus 101 executes a sheet loading sequence (the print sheet registration sequence illustrated in FIG. 7) so that the user loads the specified sheets in the sheet feeding port 302. After the printing apparatus 101 executes the sheet loading sequence in step S3012, the processing proceeds to step S3004.

If the type and the size of the print sheets specified in the print job and those of the sheets currently loaded in the sheet feeding port 302 are the same as each other, the printing apparatus 101 determines that sheets are present (NO in step S3003), and the processing proceeds to step S3004. In a case where the print job is a print job according to facsimile reception, and if sheets are loaded in the sheet feeding port 302, the processing can proceed to step S3004.

In step S3004, the printing apparatus 101 controls the printing unit 205 to feed a single sheet loaded in the sheet feeding port 302 and execute printing. In step S3005, the printing apparatus 101 notifies the server 102 that a sheet is consumed at the timing when the printing is executed and the sheet is discharged.

When the printing apparatus 101 notifies the server 102 that a sheet is consumed, the printing apparatus 101 adds the serial ID of the printing apparatus 101 and the product ID of the sheets currently loaded in the sheet feeding port 302 as parameters, and notifies that a sheet is consumed.

If the server 102 receives the notification that a sheet is consumed from the printing apparatus 101, the processing proceeds to step S3006. In step S3006, the server 102 identifies a stock management table corresponding to the serial ID of the printing apparatus 101 based on the parameters included in the notification. The printing apparatus 101 identifies a number-of-consumed-sheets counter corresponding to the product ID added as a parameter in the notification that a sheet is consumed based on the identified stock management table. The printing apparatus 101 then adds 1 to the counter (counts up the counter by 1). Consequently, information for managing the remaining number of the sheets managed in the stock management table is updated.

FIGS. 14A and 14B are diagrams illustrating examples of the states of the stock management table.

FIG. 14A illustrates the state where the sheets of which the product ID is "0010023001231231123" are consumed by printing for the first time after the registration, 1 is added to the number-of-consumed-sheets counter in step S3006 in FIG. 13. As illustrated in FIG. 14A, the number of consumed sheets is "1" by adding "1" to the number of consumed sheets "0".

In step S3007, the server 102 compares the number of consumed sheets of the sheets and the order threshold to determine whether the number of consumed sheets of the sheets is greater than or equal to the order threshold. If the number of consumed sheets is less than the order threshold (NO in step S3007), the server 102 returns a response to the notification that a sheet is consumed, to the printing apparatus 101.

If, in contrast, the sheets continue to be consumed, the number-of-consumed-sheets counter reaches, in step S3006, a value greater than or equal to the order threshold as illustrated in FIG. 14B. In step S3007, the server 102 determines that the number of consumed sheets of the sheets is greater than or equal to the order threshold (YES in step S3007), and the processing proceeds to step S3008. The determination becomes YES in step S3007 only when the number of consumed sheets of the sheets becomes greater than or equal to the threshold. From this point onward, the determination becomes NO in step S3007 even if the number of consumed sheets of the sheets is greater than the threshold, thereby preventing a sheet deliver process in step S3008 from being redundantly performed. Alternatively, the determination in step S3007 can be made regarding whether the number of consumed sheets of the sheets is equal to the threshold. Yet alternatively, a flag regarding whether sheets are delivered can be provided in the stock management table, and the determination can be YES in step S3007 only if sheets are not delivered.

In step S3008, the server 102 displays on the display 411 the serial ID of the printing apparatus 101, the product ID of the sheets, and a message screen for urging a deliver process, and returns a response to the notification that a sheet is consumed to the printing apparatus 101. The method for notifying an operator of the message urging the deliver process is not limited to the display of the screen, and can be another method. For example, a method for notifying a person in charge of delivery set in advance by email can be employed, or a configuration can be employed in which a person in charge is notified by the display of the screen when the person in charge logs into the system.

In the present embodiment, the operator having confirmed the message urging the deliver process references customer management information, examines the address of a user having the serial ID of the printing apparatus 101, and delivers sheets having the same sheet name (type) and the same sheet size as the product ID to the address of the user. Alternatively, a configuration can be employed in which the customer management information is stored in advance in the server 102, and the address of a customer corresponding to the serial ID of the printing apparatus 101 is searched for, and the found address is displayed in step S3008. Although a configuration is illustrated in which the operator is notified of the message urging the deliver process, the present disclosure is not limited to this. For example, a configuration can be employed in which another server for the deliver process is provided, and the server 102 notifies the other server of information required for the delivery (the serial ID of the printing apparatus 101 and the product ID), and the other server performs the delivery process. That is, any configuration can be employed in which some process is started for delivering sheets having the same name (type) and the same size as those of sheets identified based on the product ID to the delivery destination corresponding to the printing apparatus 101.

If the printing apparatus 101 receives the response to the notification that a sheet is consumed from the server 102, the processing proceeds to step S3009.

In step S3009, the printing apparatus 101 confirms whether the printing of as many pages and copies as the number of pages and the number of copies specified in the print job received in step S3001 is completed (the job end). If a page to be printed is still left (NO in step S3009), the processing proceeds to step S3003.

If, in contrast, the printing of all the pages and copies is already completed (YES in step S3009), the processing proceeds to step S3010.

In step S3010, the printing apparatus 101 returns the screen of the touch panel 208 to a standby screen, and the processing ends.

In the sequence illustrated in FIG. 13, a configuration has been illustrated in which, every time the printing apparatus 101 performs printing on a single sheet, the printing apparatus 101 sends a notification that a sheet is consumed to the server 102. The present disclosure, however, is not limited to this. For example, a configuration can be employed in which at the timing when the job ends or at the timing when sheets are absent in step S3003, the printing apparatus 101 notifies the server 102 of the number of sheets consumed by the job.

There is also a case where a paper jam occurs during the execution of a job, whereby a difference may occur between the number of sheets fed by the job and the number of sheets discharged by the completion of printing (the number of printed sheets).

In such a case, a configuration can be employed in which at the timing when the job ends, the printing apparatus 101 notifies the server 102 of the number of sheets consumed by a paper jam or the like (e.g., the number of fed sheets–the number of printed sheets, i.e., the difference between the number of fed sheets and the number of printed sheets). Then, the server 102 corrects the number of consumed sheets of the sheets managed in the stock management table according to this notification.

A case where the user uses print sheets for another use or a case where print sheets cannot be used due to breakage or dirt is possible. Thus, in the present embodiment, a method for correcting the number of consumed sheets in the stock management table is provided. For example, if the following configuration is employed, the user can correct the stock management table. A stock management table correction screen is provided on the touch panel 208 of the printing apparatus 101, and the printing apparatus 101 acquires the stock management table from the server 102 using an operation of the user as a trigger and displays the stock management table on the touch panel 208. Next, if the user corrects and finalizes the number of consumed sheets by operating the touch panel 208, the printing apparatus 101 transmits the corrected stock management table to the server 102. The server 102 having received the corrected stock management table overwrites the existing stock management table with the corrected stock management table and stores the overwritten stock management table. Alternatively, a configuration can be employed in which an external apparatus, such as a personal computer, accesses the server 102 and corrects the stock management table.

Although the touch panel 208 of the printing apparatus 101 is used to correct the stock management table, a configuration can be employed in which a general-purpose terminal (an external apparatus), such as a PC or a smartphone, owned by the user accesses the server 102 and corrects the stock management table.

As described above, the stock management table according to the present embodiment can be corrected through a printing apparatus or an external apparatus.

If the initial number of sheets and the number of consumed sheets become equal to each other by the counting up in step S3006, this means that all the sheets of this product are consumed. In this case, the server 102 includes the product ID and information indicating the consumption of all the sheets in the response to the printing apparatus 101.

Further, the server 102 can delete the information regarding the product ID from the stock management table. The printing apparatus 101 having received the response including the product ID and the information indicating the consumption of all the sheets can delete the information regarding the product ID from the list of sheets registered in the past that is saved in the non-volatile memory 202.

With the above configuration, the printing system 100 can register the serial number of the printing apparatus 101 in the server 102 as illustrated in the printing apparatus registration sequence in FIG. 5, and therefore, the server 102 can manage the stock of sheets with respect to each individual printing apparatus 101. Further, as illustrated in the sheet registration sequence in FIG. 7, the user registers the product ID of sheets and notifies the server 102 of the product ID, whereby the server 102 can register the product of the sheets in the stock management table and appropriately manage the stock of each product.

As illustrated in the print sheet stock management sequence in FIG. 13, the printing apparatus 101 notifies the server 102 of the consumption status of sheets with the product ID of the sheets every time the printing apparatus 101 consumes a sheet, whereby the server 102 can count up the number of consumed sheets with respect to each product ID of sheets. Thus, it is possible to perform an appropriate sheet deliver process at an appropriate timing.

FIG. 15 is a diagram illustrating an example of a stock management table in which a plurality of types of sheets is registered.

As illustrated in FIG. 15, it is possible to appropriately manage the stocks also in a case where the user uses a plurality of types of sheets in a distinguished manner.

In the present embodiment, if sheets are the same sheets in print settings, but have different prices, the sheets are set so that the product IDs of the sheets are different from each other also in the information other than the unique IDs, whereby it is possible to separately manage the sheets. For example, there is a case where both inexpensive plain paper and expensive plain paper are set as the same "plain paper" in print settings. Even in this case, the sheets are registered in a distinguished manner independently of the print settings. Thus, the effect of managing the stocks of the sheets by distinguishing inexpensive plain paper and expensive plain paper is also obtained.

"Number of consumed sheets" in the stock management table can be changed to "number of stocked sheets", and every time a sheet is consumed, 1 may be subtracted from the number of stocked sheets. In this case, for example, the order threshold is set to 20 percent of the initial number of sheets, and when the number of stocked sheets becomes 20 percent or less, the sheet delivery process is started.

In the present embodiment, the unique ID in the product ID is referenced, whereby even sheets having the same name and the same size are distinguished as different products. The present disclosure, however, can also be carried out by a method for regarding sheets having the same sheet name and the same size as the same product, thereby managing the stock of the product.

In this case, a configuration is employed in which "number of consumed sheets" in the stock management table is changed to "number of stocked sheets".

When sheets are registered in the stock management table in step S2012 in FIG. 7, a configuration can be employed in which the stock of the sheets is managed by adding the initial number of sheets of the sheets to the number of stocked sheets that is already registered if the IDs other than the unique ID match those of the currently registered sheets. Alternatively, "number of consumed sheets" may be used, and after sheets are delivered, and if the number of consumed sheets of the sheets reaches the number of sheets corresponding to 100% of the initial number of sheets, the number of consumed sheets can be changed back to 0% (i.e., 0 sheets).

In the case of the method for regarding sheets having the same sheet name and the same size as the same product and managing the stocks of the product, the unique IDs are not essential for the stock management. Thus, the unique IDs can be excluded from the product IDs. Alternatively, a configuration can also be employed in which the user selects the name and the size of sheets without using IDs to register the sheets.

An example has been described where a printing apparatus includes only a single sheet feeding port in the present embodiment. However, the present disclosure can also be applied to a printing apparatus including a plurality of sheet feeding ports. In this case, a configuration can be employed in which the current sheets registered in step S2006 or S2015 in FIG. 7 can be registered with respect to each sheet feeding port. The server 102 can thus be notified of a product ID to be notified in step S3005 in FIG. 13 and corresponding to the current sheets registered in the sheet feeding port having fed the sheet in step S3004 in FIG. 13.

Alternatively, the stock management table can be provided not in the server 102, but in another information processing apparatus with which the server 102 can communicate.

According to the first embodiment, the user can easily register pieces of sheet information regarding the type, the size, and the number of sheets in the printing system and then use the sheets. Consequently, for example, even in a space-saving or low-cost printing apparatus, such as a household printing apparatus, it is possible to perform appropriate stock management, and to deliver sheets at an appropriate timing. As a result, it is possible to significantly improve convenience for a user.

Types of plain paper in a variety of price ranges are commercially available, and there may be a case where the user appropriately uses expensive plain paper and inexpensive plain paper according to the use. In this case, if the expensive plain paper and the inexpensive plain paper cannot be specified in a distinguished manner in print settings, the numbers of output sheets cannot be counted in a distinguished manner, either, and it is not possible to perform appropriate stock management. In the present embodiment, however, it is possible to solve this issue and achieve appropriate stock management with respect to each finely classified type of sheet.

A second embodiment different in configuration from the first embodiment will now be described.

In the second embodiment, the configuration of the printing system 100 and the configurations of the printing apparatus 101 and the server 102 are similar to those in the first embodiment, and therefore are omitted.

Figure 16:
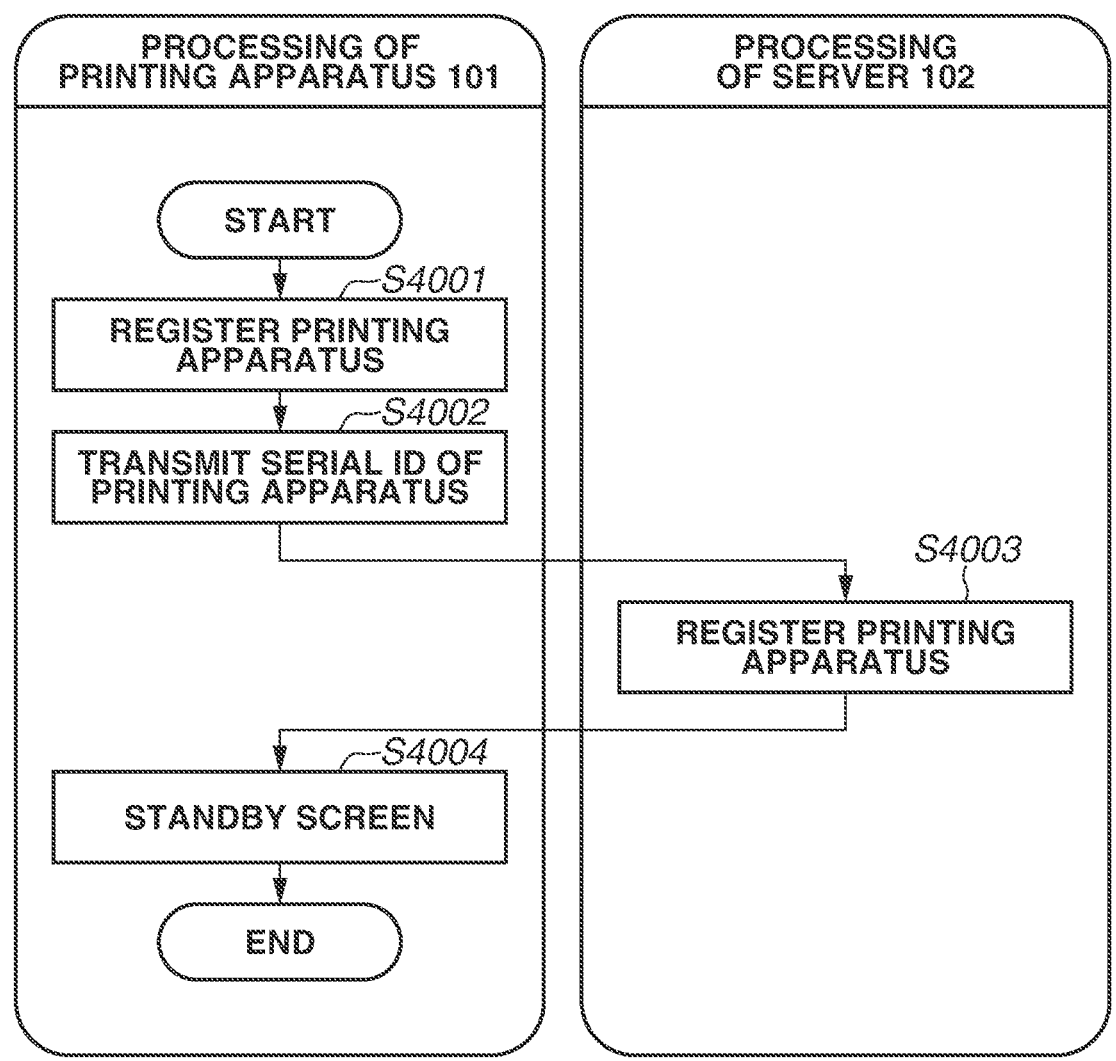
FIG. 16 is a sequence diagram illustrating a printing apparatus registration sequence according to a second embodiment.
Figure 17:
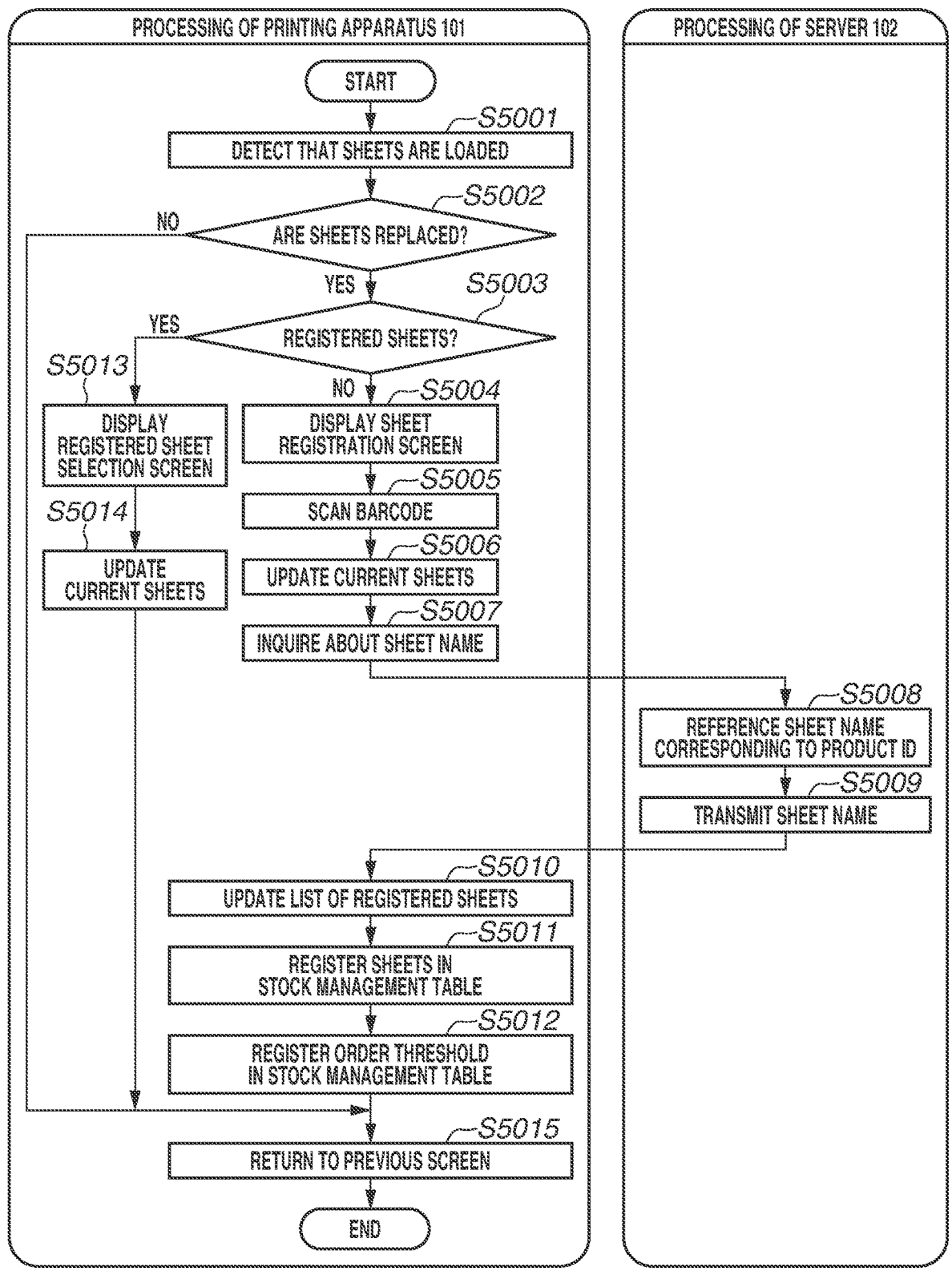
FIG. 17 is a sequence diagram illustrating a print sheet registration sequence according to the second embodiment.
Figure 18:
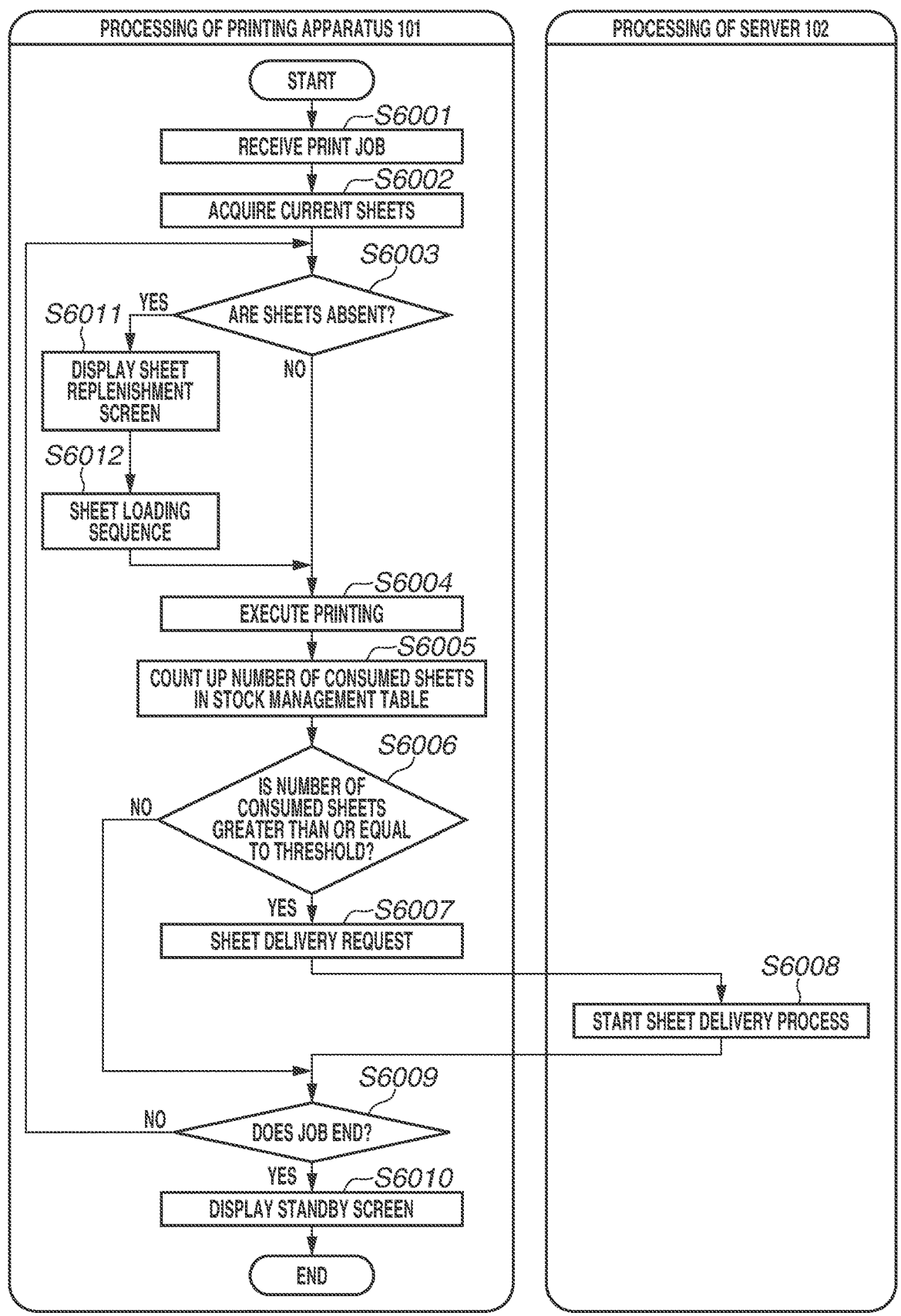
FIG. 18 is a sequence diagram illustrating a print sheet stock management sequence according to the second embodiment.

FIG. 16 is a sequence diagram illustrating an example of a printing apparatus registration sequence according to the second embodiment. In the sequence diagram illustrated in FIG. 16 and sequence diagrams in FIGS. 17 and 18 illustrated below, the processing of the printing apparatus 101 is achieved by the CPU 201 reading and executing a program stored in the non-volatile memory 202. Similarly, the processing of the server 102 is achieved by the CPU 401 reading and executing a program stored in the program memory 402 or the non-volatile memory 404.

Steps S4001 and S4002 are similar to steps S1001 and S1002 in FIG. 5 in the first embodiment, and therefore are omitted.

If the server 102 receives a printing apparatus registration request, the server 102 stores, in step S4003, the serial ID of the printing apparatus 101 added as a parameter in the non-volatile memory 404, and sends a response to the printing apparatus registration request to the printing apparatus 101.

Step S4004 is similar to step S1004, and therefore is omitted.

In the second embodiment, the server 102 does not create a stock management table unlike the first embodiment. An operator can reference the serial ID of the printing apparatus 101 stored in the server 102 and check the serial ID against customer information.

FIG. 17 is a sequence diagram illustrating an example of a sheet registration sequence according to the second embodiment.

Steps S5001 to S5010 are similar to steps S2001 to S2010 in FIG. 7 according to the first embodiment, and therefore are omitted. Steps S5013, S5014, and S5015 are similar to steps S2014, S2015, and S2016, respectively, and therefore are omitted.

In step S5011, the printing apparatus 101 registers the product ID of the sheets in the stock management table stored in advance in the non-volatile memory 202 of the printing apparatus 101.

In step S5012, the printing apparatus 101 sets the order threshold in the stock management table saved in the non-volatile memory 202. The present embodiment is described on the assumption that, similarly to the first embodiment, the order threshold is set to 80 percent of the initial number of sheets. The present disclosure, however, is not limited to this. Alternatively, the order threshold can be set to another proportion, or the order threshold can be set to a determined number.

By using the sheet registration sequence illustrated in FIG. 17, it is possible for the user to register sheets to be loaded in the sheet feeding port 302 in the stock management table of the printing apparatus 101.

FIG. 18 is a sequence diagram illustrating an example of a print sheet stock management sequence according to the second embodiment.

Steps S6001 to S6004 are similar to steps S3001 to S3004 in FIG. 13 in the first embodiment, and therefore are omitted. Similarly, steps S6008 to S6012 are similar to steps S3008 to S3012 in FIG. 13 in the first embodiment, and therefore are omitted.

When the printing on a single sheet is completed in step S6004, then in step S6005, the printing apparatus 101 counts up the number of consumed sheets of the sheets in the stock management table in the non-volatile memory 202. At this time, the printing apparatus 101 counts up the number of consumed sheets of the sheets corresponding to the product ID of the sheets currently loaded in the sheet feeding port 302 that are registered through the sheet registration sequence in FIG. 17.

In step S6006, the printing apparatus 101 compares the number of consumed sheets of the sheets and the order threshold and determines whether the number of consumed sheets of the sheets is greater than or equal to the order threshold. If the number of consumed sheets of the sheets is less than the order threshold (NO in step S6006), the processing proceeds to step S6009.

In contrast, if the number of consumed sheets of the sheets is greater than or equal to the order threshold (YES in step S6006), the processing proceeds to step S6007. The determination result in step S6006 becomes YES only when the number of consumed sheets of the sheets is greater than or equal to the threshold. From this point onward, even if the number of consumed sheets of the sheets is greater than the threshold, the determination is NO in step S6006, thereby preventing a sheet delivery request in step S6007 from being redundantly made. Alternatively, the determination in step S6006 can be made regarding whether the number of consumed sheets of the sheets is equal to the threshold. Yet alternatively, a flag regarding whether sheets are delivered can be provided in the stock management table, and only if sheets are not delivered, the determination can be YES in step S6006.

In step S6007, the printing apparatus 101 makes a sheet delivery request to the server 102. At this time, the serial ID of the printing apparatus 101 and the product ID of the sheets are added as parameters to the sheet delivery request.

If the server 102 receives the sheet delivery request from the printing apparatus 101, the processing proceeds to step S6008.

In step S6008, the server 102 starts a sheet delivery process using the parameters added to the sheet delivery request.

With the above configuration, in the printing system 100 according to the present embodiment, it is possible to manage the stock of each product of sheets based on a configuration in which the printing apparatus 101 has a stock management table for sheets unlike the first embodiment. A sheet delivery request is made at the timing when the number of consumed sheets exceeds the order threshold, it is therefore possible to deliver appropriate sheets at an appropriate timing.

Although the present embodiment is an embodiment in which cut sheets are assumed, the present disclosure can also be carried out by using a printing apparatus that handles a roll of paper. In this case, the stock management table is not be managed based on the numbers of sheets, such as the initial number of sheets and the number of consumed sheets, but can be managed based on lengths, such as the initial length and the consumption length. For example, in a case where a roll of paper having a length of 100 meters is loaded, then in the sheet registration sequence, the initial length can be saved as 100 and the order threshold can be saved as 80 in the stock management table. The printing apparatus 101 can notify the server 102 of the length of paper consumed by printing, thereby adding a value to the consumption length. When the consumption length reaches the determined order threshold, an order process can be started.

Stock management can be performed based on the remaining number of sheets. In this case, the number of stocked sheets at the timing when sheets are ordered is set as the order threshold. For example, a state where the remaining number reaches 20 percent of the initial number of sheets can be set as the order threshold. In this case, if the initial number of sheets is 300, 60 is set as the order threshold when the sheets are registered. When the remaining number reaches 60, an order process is performed.

Alternatively, the stock management table can be provided not in the printing apparatus 101, but in another information processing apparatus with which the printing apparatus 101 can communicate.

According to the second embodiment, an effect similar to that in the first embodiment is obtained.

In the above embodiments, the user registers pieces of sheet information regarding sheets in a new package loaded in a sheet feeding port of a printing apparatus and creates a stock management table with respect to each piece of sheet information. The pieces of sheet information allow the identification of the type, the size, and the number of the sheets. With respect to each piece of sheet information regarding the printing apparatus, the sheet consumption status is reflected on the stock management table, thereby performing appropriate stock management with respect to each piece of sheet information. With this configuration, it is possible to perform appropriate stock management with respect to each piece of sheet information, and therefore, it is possible to provide a system that delivers sheets at an appropriate timing. The user can easily register pieces of sheet information regarding the type, the size, and the number of sheets in the printing system and then use the sheets. With this configuration, for example, even in a space-saving or low-cost printing apparatus, such as a household printing apparatus, it is possible to perform appropriate stock management, and it is possible to deliver sheets at an appropriate timing. It is also possible to deal with the use where the user appropriately uses expensive plain paper and inexpensive plain paper according to the use, and it is possible to achieve appropriate stock management with respect to each finely classified type of sheet. As a result, it is possible to significantly improve convenience for a user. That is, it is possible to significantly improve usability.

The configurations and the contents of the above various pieces of data are not limited to these, and the various pieces of data can include a variety of configurations and contents according to the use or the purpose.

While the embodiments have been described above, the present disclosure can employ an embodiment as, for example, a system, an apparatus, a method, a program, or a storage medium. Specifically, the present disclosure can be applied to a system including a plurality of devices, or can be applied to an apparatus composed of a single device.

All the configurations obtained by combining the above embodiments are also included in the present disclosure.

The present disclosure can also be achieved by the process of supplying a program for achieving one or more functions of the above embodiments to a system or an apparatus via a network or a storage medium, and of causing one or more processors of a computer of the system or the apparatus to read and execute the program. The present disclosure can also be achieved by a circuit (e.g., an application-specific integrated circuit (ASIC)) for achieving the one or more functions.

The present disclosure can be applied to a system including a plurality of devices, or can be applied to an apparatus composed of a single device.

The present disclosure is not limited to the above embodiments. Various modifications (including organic combinations of the embodiments) can be made based on the spirit of the present disclosure, and are not excluded from the scope of the present disclosure. That is, all the configurations obtained by combining the above embodiments and their variations are also included in the present disclosure.

According to the above description, it is possible to appropriately manage the stock of sheets, and it is possible to deliver sheets at an appropriate timing. Therefore, it is possible to significantly improve convenience for a user.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-127977, filed Aug. 10, 2022, which is hereby incorporated by reference herein in its entirety.

What is claimed is:

1. A printing system comprising:
   at least one memory and at least one processor and/or at least one circuit which function as:
   an input unit configured to perform control to input sheet information regarding a single set of sheets consisting of a plurality of sheets including a sheet loaded in a sheet feeding unit of a printing apparatus;
   a registration unit configured to perform control to, based on the sheet information input by the input unit, register a number of sheets corresponding to a single set in management information in which a stock of sheets is managed; and
   an update unit configured to perform control to, based on consumption of a sheet by the printing apparatus, update information managed in the management information,
   wherein the input unit performs control to input, as the sheet information, information obtained by reading and decoding a code image added to a package of the single set of sheets, and
   the at least one memory and at least one processor and/or at least one circuit further function as a display control unit configured to perform control to, when the sheet information is input, display a screen for urging a user to read the code image.

2. The printing system according to claim 1, wherein the single set of sheets is a group of sheets set as a single package when the sheets are sold or delivered.

3. The printing system according to claim 1, wherein the input unit performs control to input information that allows identification of at least one of a product identifier (ID) of the single set of sheets and the number of sheets corresponding to the single set, as the sheet information.

4. The printing system according to claim 1,
   wherein the input unit performs control to input information including a product ID of the single set of sheets, as the sheet information, and
   wherein the registration unit performs control to register the number of sheets corresponding to the single set of sheets that is identified based on the product ID included in the sheet information.

5. The printing system according to claim 1, wherein the code image is read by a scanner included in the printing apparatus.

6. The printing system according to claim 1,
   wherein, in a case where a new sheet is loaded in the sheet feeding unit, if a particular condition corresponding to a state where the number of sheets corresponding to a new single set should not be registered is satisfied, the input unit does not perform particular control regarding the input of the sheet information for the registration unit to register the number of sheets corresponding to a single set, and
   wherein, in a case where a new sheet is loaded in the sheet feeding unit, if the particular condition is not satisfied, the input unit performs the particular control.

7. The printing system according to claim 6, wherein the particular condition is a condition indicating that a newly loaded sheet is a sheet included in a single set registered by the registration unit.

8. The printing system according to claim 1, wherein a number of sheets that are loaded in the sheet feeding unit at a time is smaller than the number of sheets corresponding to the single set.

9. The printing system according to claim 1, wherein the at least one memory and at least one processor and/or at least one circuit further function as a correction unit configured to, based on a difference between a number of sheets fed by the printing apparatus and a number of sheets discharged by completion of printing, correct the information managed in the management information.

10. The printing system according to claim 1, wherein the at least one memory and at least one processor and/or at least one circuit further function as a correction unit configured to, based on a user operation performed on the printing apparatus, correct the information managed in the management information.

11. The printing system according to claim 1, wherein the at least one memory and at least one processor and/or at least one circuit further function as a processing unit configured to, in a case where a predetermined condition corresponding to a state where a stock of sheets decreases is satisfied based on the information managed in the management information, perform a process of delivering a new set of sheets.

12. The printing system according to claim 1,
wherein the printing system includes the printing apparatus and at least one server on a network configured to communicate with the printing apparatus,
wherein the printing apparatus includes at least one memory and at least one processor and/or at least one circuit which function as the input unit, and
wherein the at least one server includes at least one memory and at least one processor and/or at least one circuit which function as the registration unit and the update unit.

13. The printing system according to claim 1,
wherein the printing system includes the printing apparatus, and
wherein the printing apparatus includes at least one memory and at least one processor and/or at least one circuit which function as the input unit, the registration unit, and the update unit.

14. A printing system comprising:
at least one memory and at least one processor and/or at least one circuit which function as:
an input unit configured to perform control to input sheet information regarding a single set of sheets consisting of a plurality of sheets including a sheet loaded in a sheet feeding unit of a printing apparatus;
a registration unit configured to perform control to, based on the sheet information input by the input unit, register a number of sheets corresponding to a single set in management information in which a stock of sheets is managed; and
an update unit configured to perform control to, based on consumption of a sheet by the printing apparatus, update information managed in the management information,
wherein, in a case where a new sheet is loaded in the sheet feeding unit, if a first user operation corresponding to a state where the number of sheets corresponding to a new single set should not be registered is performed, the input unit does not perform particular control regarding an input of the sheet information for the registration unit to register the number of sheets corresponding to a single set, and wherein, in a case where a new sheet is loaded in the sheet feeding unit, if a second user operation corresponding to a state where the number of sheets corresponding to a new single set should be registered is performed, the input unit performs the particular control.

15. The printing system according to claim 14,
wherein the first user operation is a user operation for indicating that the new sheet loaded is a sheet included in a single set registered by the registration unit, and
wherein the second user operation is a user operation for indicating that the new sheet loaded is not a sheet included in a single set registered by the registration unit.

16. The printing system according to claim 14, wherein the particular control includes control for displaying a screen for urging a user to input the sheet information.

17. A method for controlling a printing system, the method comprising:
performing control to input sheet information regarding a single set of sheets consisting of a plurality of sheets including a sheet loaded in a sheet feeding unit of a printing apparatus, wherein the performing control to input the sheet information performs control to input, as the sheet information, information obtained by reading and decoding a code image added to a package of the single set of sheets;
performing control to, when the sheet information is input, display a screen for urging a user to read the code image;
performing control to, based on the sheet information input, register a number of sheets corresponding to a single set in management information in which a stock of sheets is managed; and
performing control to, based on consumption of a sheet by the printing apparatus, update information managed in the management information.

18. A non-transitory computer readable storage medium storing a computer-executable program for executing a method for controlling a printing system, the method comprising:
performing control to input sheet information regarding a single set of sheets consisting of a plurality of sheets including a sheet loaded in a sheet feeding unit of a printing apparatus, wherein the performing control to input the sheet information performs control to input, as the sheet information, information obtained by reading and decoding a code image added to a package of the single set of sheets;
performing control to, when the sheet information is input, display a screen for urging a user to read the code image;
performing control to, based on the input sheet information, register a number of sheets corresponding to a single set in management information in which a stock of sheets is managed; and
performing control to, based on consumption of a sheet by the printing apparatus, update information managed in the management information.

19. A method for controlling a printing system, the method comprising:
performing control to input sheet information regarding a single set of sheets consisting of a plurality of sheets including a sheet loaded in a sheet feeding unit of a printing apparatus;

performing control to, based on the sheet information input, register a number of sheets corresponding to a single set in management information in which a stock of sheets is managed; and performing control to, based on consumption of a sheet by the printing apparatus, update information managed in the management information, wherein, in a case where a new sheet is loaded in the sheet feeding unit, if a first user operation corresponding to a state where the number of sheets corresponding to a new single set should not be registered is performed, particular control regarding an input of the sheet information to register the number of sheets corresponding to a single set is not performed, and wherein, in a case where a new sheet is loaded in the sheet feeding unit, if a second user operation corresponding to a state where the number of sheets corresponding to a new single set should be registered is performed, the particular control is performed.

20. A non-transitory computer readable storage medium storing a computer-executable program for executing a method for controlling a printing system, the method comprising:

performing control to input sheet information regarding a single set of sheets consisting of a plurality of sheets including a sheet loaded in a sheet feeding unit of a printing apparatus;

performing control to, based on the input sheet information, register a number of sheets corresponding to a single set in management information in which a stock of sheets is managed; and performing control to, based on consumption of a sheet by the printing apparatus, update information managed in the management information, wherein, in a case where a new sheet is loaded in the sheet feeding unit, if a first user operation corresponding to a state where the number of sheets corresponding to a new single set should not be registered is performed, particular control regarding an input of the sheet information to register the number of sheets corresponding to a single set is not performed, and wherein, in a case where a new sheet is loaded in the sheet feeding unit, if a second user operation corresponding to a state where the number of sheets corresponding to a new single set should be registered is performed, the particular control is performed.

\* \* \* \* \*